(12) United States Patent
Villani et al.

(10) Patent No.: US 7,709,091 B2
(45) Date of Patent: May 4, 2010

(54) COMPOSITE LIGHT WEIGHT BUILDING PANEL AND CORE MATERIAL THEREFOR

(75) Inventors: Giancarlo Antonio Villani, Wilston (AU); Vincent Michael Martin, Sunnybank Hills (AU)

(73) Assignee: E.I.F.S. Holdings, Wellington (NZ)

( * ) Notice: Subject to any disclaimer, the term of this patent is extended or adjusted under 35 U.S.C. 154(b) by 1839 days.

(21) Appl. No.: 10/343,849

(22) PCT Filed: Aug. 3, 2001

(86) PCT No.: PCT/AU01/00945

§ 371 (c)(1),
(2), (4) Date: Nov. 19, 2003

(87) PCT Pub. No.: WO02/12143

PCT Pub. Date: Feb. 14, 2002

(65) Prior Publication Data

US 2004/0088947 A1    May 13, 2004

(30) Foreign Application Priority Data

Aug. 4, 2000    (AU)    .................................... PQ 9210

(51) Int. Cl.
*B32B 27/00*    (2006.01)
*E04C 2/00*    (2006.01)
*E04C 1/00*    (2006.01)
*C04B 14/00*    (2006.01)

(52) U.S. Cl. .................... 428/422; 52/782.1; 52/309.1; 106/603

(58) Field of Classification Search ....................... None
See application file for complete search history.

(56) References Cited

U.S. PATENT DOCUMENTS

| 3,679,529 A | * | 7/1972 | Prusinski et al. | .............. 428/57 |
| 4,434,257 A | * | 2/1984 | Narisawa et al. | ............... 524/5 |
| 4,774,794 A | * | 10/1988 | Grieb | ........................ 52/309.7 |
| 4,882,888 A | * | 11/1989 | Moore | ........................ 52/309.9 |
| 5,473,849 A | * | 12/1995 | Jones et al. | ................... 52/424 |
| 5,763,508 A | * | 6/1998 | Hess et al. | ..................... 524/5 |

\* cited by examiner

*Primary Examiner*—Timothy M Speer
*Assistant Examiner*—Gordon R Baldwin
(74) *Attorney, Agent, or Firm*—Mayer & Williams, PC; Mark D. Wieczorek, Esq.

(57) ABSTRACT

A core material for a composite light weight building panel formed from a settable mixture, said mixture including an acrylic, polymer-based resin comprising:
  85% by volume water based copolymer emulsion of polyvinyl acetate with versatate and/or acrylic copolymers in a water emulsion;
  10% water soluble colloid protector;
  5% additives;
such that the resin obtains a specific gravity in the range of 1000±50 g/l and an 8 Ford viscosity at 20° C. of 7±1: and the mixture having the following ratios:
  from 1 to 3 liters of cement;
  more than 2 liters of resin;
  from 10 to 100 liters of light weight filler material;
  less than 6 kilograms of water, and
  such that the volume of cement is more than half the volume of resin.

16 Claims, 7 Drawing Sheets

COMPOSITE LIGHT WEIGHT BUILDING PANEL AND CORE MATERIAL THEREFOR

CONTINUING DATA INFORMATION

This application claims priority to PCT Patent Application Serial No. PCT/AU01/00945 filed Aug. 3, 2001 which claims priority to AU Patent Application Serial No. PQ 9210 filed Aug. 4, 2000.

TECHNICAL FIELD OF THE INVENTION

THIS INVENTION relates to a composite light weight building panel and a core material therefor.

BACKGROUND ART

The invention has been developed primarily for use in the construction of dwelling houses and will be described with reference to this application. However, it will be appreciated that the invention is not limited to this particular field of use and may be used, for example, in the construction of other buildings.

The core used for light weight panels is often made from foamed plastics material, such as polystyrene foam, and frequently includes suitable fire retardant additives. However, such foamed plastics materials are expensive and of limited strength, and often rely upon cladding or a coating to impart strength to the panel. Sometimes composite panels have a metal cladding which increases their cost. Metal clad panels may also be difficult to cut to size, especially on a house constructions site.

The present invention aims to ameliorate one or more of the above problems or at least provide an alternative composite wall panel and a core material therefor for use in building construction. Other aims and advantages may become apparent from the following description.

DISCLOSURE OF THE INVENTION

With the foregoing in view, the present invention resides broadly, according to one aspect thereof, in a core material for a composite light weight building panel formed from a settable mixture, said mixture including an acrylic, polymer-based resin comprising:
 85% by volume water based copolymer emulsion of polyvinyl acetate with versatate and/or acrylic copolymers in a water emulsion;
 10% water soluble colloid protector;
 5% additives;
such that the resin obtains a specific gravity in the range of 1000±50 g/l and an 8 Ford viscosity at 20° C. of 7±1; and the mixture having the following ratios;
 from 1 to 3 liters of cement;
 more than 2 liters of resin;
 from 10 to 100 liters of light weight filler material;
 less than 6 kilograms of water, and
 such that the volume of cement is more than half the volume of resin.

Suitably, the additives include glycols, mildew agents, foam suppressant, colouring agents, setting agents, wetting agents and/or dispersants, and preferably the copolymer emulsion comprises (dry) approximately 70% polyvinyl acetate, approximately 29% vinyl versatate and 1% acrylic acid. One preferred copolymer emulsion comprises (dry) 69.3% polyvinyl acetate, 29.7% vinyl versatate and 1% acrylic acid, the polymers comprising 45.5% of the emulsion, the balance being water. It will be appreciated by the addressee skilled in the art of aqueous polymer emulsions that the copolymer emulsion and its additives may be varied in its composition whilst providing a polymer-based resin which will set in normal atmospheric conditions.

Preferably, the acrylic, polymer-based resin is of the type identified by the trade mark "JOLLY FIX" as the product of Colorifico A. & B. Casati S.p.A of Verona, Italy, having their Product Code 109001, and having as one of its components 2-methyl-2,4-pentanediol. This product is an acrylic, polymer-based liquid resin (or powdered form if desired) currently sold in 16 liter containers, designed for use as a masonry sealer, the normal instructions being to dilute the product with water and then paint it over the masonry for sealing purposes. An alternative source of this material is Prima Enterprises Pty Ltd of Brisbane, Australia having their product code "J Fix 101". Its use in the present invention, with unexpected results, and in novel proportions, meets a long-standing demand for products of this type having desirable characteristics.

In another aspect, the invention resides broadly in a core material for a composite light weight building panel formed from a settable mixture, said mixture including an acrylic, polymer-based resin as hereinbefore described and having the ratios:
 from 1 to 1½ liters of cement;
 from 2 to 4 liters of resin;
 from 60 to 100 liters of light weight filler material:
 less than 2 kilograms of water.

Preferably, the consistency of the mixture is paste-like, and may be thixotropic such that the mixture may be formed into the shape of a panel core with the aid of vibration. It is also preferred that the panel core is substantially planar having two opposite spaced apart faces. In such form, it is further preferred that the core material includes a backing sheet, such as fibro cement, plywood, or paper.

In a preferred form, the mixture has the following ratios:
 6 liters of resin;
 4 liters of water;
 8 liters of cement, and
 from 60 to 100 liters of light weight filler material.

Preferably, the light weight filler material is in the form of polystyrene foam beads of approximately 3 mm diameter. However, other filler materials have been found to provide alternatives, including minerals, such as perlite, vermiculite, or similar minerals, paper comminuted to short or long strips, or sawdust. The ratios of solids materials (cement and light weight filler material) and liquid materials (water and resin) are selected to produce a core forming composition of paste-like consistency when mixed together, and which may be formed into a desired shape, particularly, a planar panel-like shape, and allowed to set to form a core panel.

If additional strength is required, up to 40 g short strand fibreglass may be added to the mixture. Additionally, fibreglass textile sheet may be included within the core panel, approximately medially between the two faces, the fibreglass being added to the core panel in accordance with a method according to the invention described hereinafter.

In a further preferred form, the core panel is coated with a coating composition comprised in a mixture of sand or equivalent material, standard quality cement, water, and an acrylic, polymer-based resin as hereinbefore described, the mixture having the following ratios:
 for every kilogram of sand:
 more than 20 volume percent (vol %) cement; less than 12 vol % water; and more than 20 volt resin;

such that the ratio of resin to water is more than four to one, and the ratio of resin to cement is less than two to one.

The coating composition may be formulated without the water, but it is preferred that the water is more than 4 volt of the sand.

In one example, the coating composition has the aforementioned ingredients are used in the proportions by volume of 5 liters of resin; 4 liters of cement, 20 kg (12 liters) of sand and 400 ml of water. However, in other Examples, the material formulation by volume ranges within the following:

| | |
|---|---|
| Resin: | 5 liters (plus 300% down to less 70%) |
| Cement: | 4 liters (plus 100% down to less 70%, or further down to none at all) |
| Sand: | 12 liters (plus 100% down to less 50%) and |
| Water: | 300-500 ml (plus or minus 100%), all depending on the temperature as described. |

The ingredients for the coating may be mixed in any suitable container, such as of metal or plastics material, the easiest procedure being to place the resin and water in the container and cause these to be mixed by stirring steadily, adding the cement and sand progressively, such as in a standard concrete mixer. However, provided thorough mixing is ensured, all ingredients could be added simultaneously to the container. The mixed product should be used without being stored since it contains a cement component and will set in a reasonably short period of time, such as 12 hours when in mixed bulk form. However, if a film of water is placed over the product in a container, it may be stored overnight for example, being able to be re-mixed manually and used without loss of efficiency.

The mixed product can be applied to the panels of the present invention at a building site after the moulding has been fixed in place. It will thus be apparent that the coating composition can be used also as a patching compound, covering marks left by penetrable fasteners when such procedures are called for, and also usable for repair purposes in the event of damage to a moulding or the unlikely event of delamination occurring. The coating composition may be used as a filler if repairs are needed to existing mouldings, even if such existing mouldings were manufactured in accordance with the prior art.

The cement used may be any type of standard quality cement, but it has been found that standard Portland cement, ivory or white, is effective. The sand used is preferably beach sand which is quite fine, but any sand-like substitute could be used, provided it has a generally comparable grain size. It will be apparent that the key component is the resin product as hereinbefore described.

The coating composition may be applied to a panel of the present invention by manual spraying, mechanical spraying, or the panels may be immersed into the coating composition. The coating composition could be trowelled on, or brushed on or sponged on. Preferably there is used a manual spray action employing a hand-held, standard domestic or industrial hopper gun, spraying being arranged at various degrees and angles depending upon the size and shape of the moulding. This can be achieved by forward and backward movement alternately in the longitudinal direction of the panel or by circular rotation progressively in a spiral or equivalent circular-type motion until the desired thickness of coating has been attained. An operator may incorporate air-flow pressure and hand-trigger adjustment of the hopper gun to create the desired steady flow and ensure evenness of coating to the polystyrene, the pressure in the compressor for spraying purposes being about 2.8±1.4 MPa (400±200 psi).

Because the coating composition is light in weight yet strong in durability, the coating thickness can be as small as 0.05 mm, but the preferred thickness is 1 mm to 2 mm, and sometimes up to 10 mm or more where filling is required, preferably applied in successive operations spaced in time. While the coatings are light in weight, they give a solid, more cement-like appearance in the final product. There can be a price saving to the consumer since less material is applied for comparable results, while there is the major advantage that delamination should not occur with these compositions. Most importantly, no primer will be required for adequate adhesion and the resultant product will be found to offer good water-resistance characteristics. The coating composition may also be formulated without sand.

In an alternative preferred form, the other face is coated with an alternative coating composition comprising (by volume);

a primary portion of adhesive material formed from ethylene vinyl acetate copolymer diluted with 0% to 21% acrylic paint and 0% to 8% water, and a secondary portion of textile material at least partially embedded in the primary portion.

Preferably, the textile material is substantially completely embedded in the adhesive material, and more preferably, such that the textile material is completely wetted or saturated by the adhesive material. It is preferred that the textile material be a fibreglass textile material ranging from a fibreglass tissue having a gram weight specification of 40/300 g/m$^2$ to a fibreglass mesh having a gram weight specification of 50/400 g/m$^2$.

Other coatings may be provided, such as render, followed by a finishing coating, such as paint, granosite, or such like.

In another aspect, the present invention resides broadly in a building panel having a backing sheet and a core formed from a core material as hereinbefore described bonded to the backing sheet, the core having a coatable face remote from the backing sheet, and a coating applied to the coatable face for weatherproofing the panel.

Preferably, the coatable face is formed with a rough surface to permit the coating to be keyed in. For example, a render coating for weatherproofing is preferably applied in such manner that the render material penetrates at least partially into the coatable face.

In another aspect, the present invention resides broadly in a method of forming a core for a light weight composite building panel, said method including the steps of:

providing a quantity of water and resin in a ratio as hereinbefore described, and mixing the water and resin together;

adding thereto and mixing in a quantity of cement in a ratio as hereinbefore described to the water and resin to produce a slurry;

adding thereto and mixing in a quantity of light weight filler material in a ratio as hereinbefore described to produce a core forming composition;

forming the core forming composition into a panel shape, and leaving the panel shaped core forming composition for a time sufficient to set into a core forming panel.

Preferably, the mixture is applied to a backing board of fibre-cement, plywood, polystyrene sheet or such like to an overall panel thickness of from 30 mm to 100 mm. The panels are preferably of an industry standard size, such as 2.45 meters by 600 mm or 800 mm. The method may incorporate the step of adding a layer of fibreglass textile to a first layer of the mixture prior to setting thereof, and adding a second layer of the mixture to the first layer onto the fibreglass textile to embed the fibreglass layer between the first and second layers of the mixture. If desired, the fibreglass textile may be pressed into the first layer of the mixture, or wetted with water, resin, or a mixture thereof, or pre-soaked with the mixture without the light weight filler material, to decrease the likelihood of air being entrapped in the fibreglass textile.

The method may then include the steps of coating the core with one or more of the coating compositions as hereinbefore described, and allowing the coating or coatings to set. A coating suitable for external use may be provided on one face according to the intended use of the finished panel.

The ingredients may be mixed in any suitable container, but preferably are loaded into a high speed blender. Mixers of the type which have a tumbling action are also suitable, such as concrete mixers.

BRIEF DESCRIPTION OF THE DRAWINGS

In order that the invention may be more readily understood and put into practical effect, reference will now be made to the accompanying drawings which illustrate a typical application of a preferred embodiment of the invention, and in which.

DETAILED DESCRIPTION OF THE DRAWINGS

In the drawings, the same reference numerals are used to indicate the same or corresponding parts, though not all such parts are given reference numerals in each drawing. The panel 10 shown in each of FIGS. 1 to 7 is fixed to a stud 21 by a several fixing brackets shown typically at 22 so that it is spaced therefrom. A wall lining 23 is fixed to the stud (and other parts of a building frame not shown).

The panel has an inner face closer to the stud and an outer face spaced therefrom, and a reinforcing mesh 11 interposed between the faces. The inner face has a backing membrane bonded thereto, and the outer face has a render coating applied. The brackets are fixed to a channel 17 embedded in the panel with its web against the inner surface and its flanges extending into the body of the panel.

Figure 1:
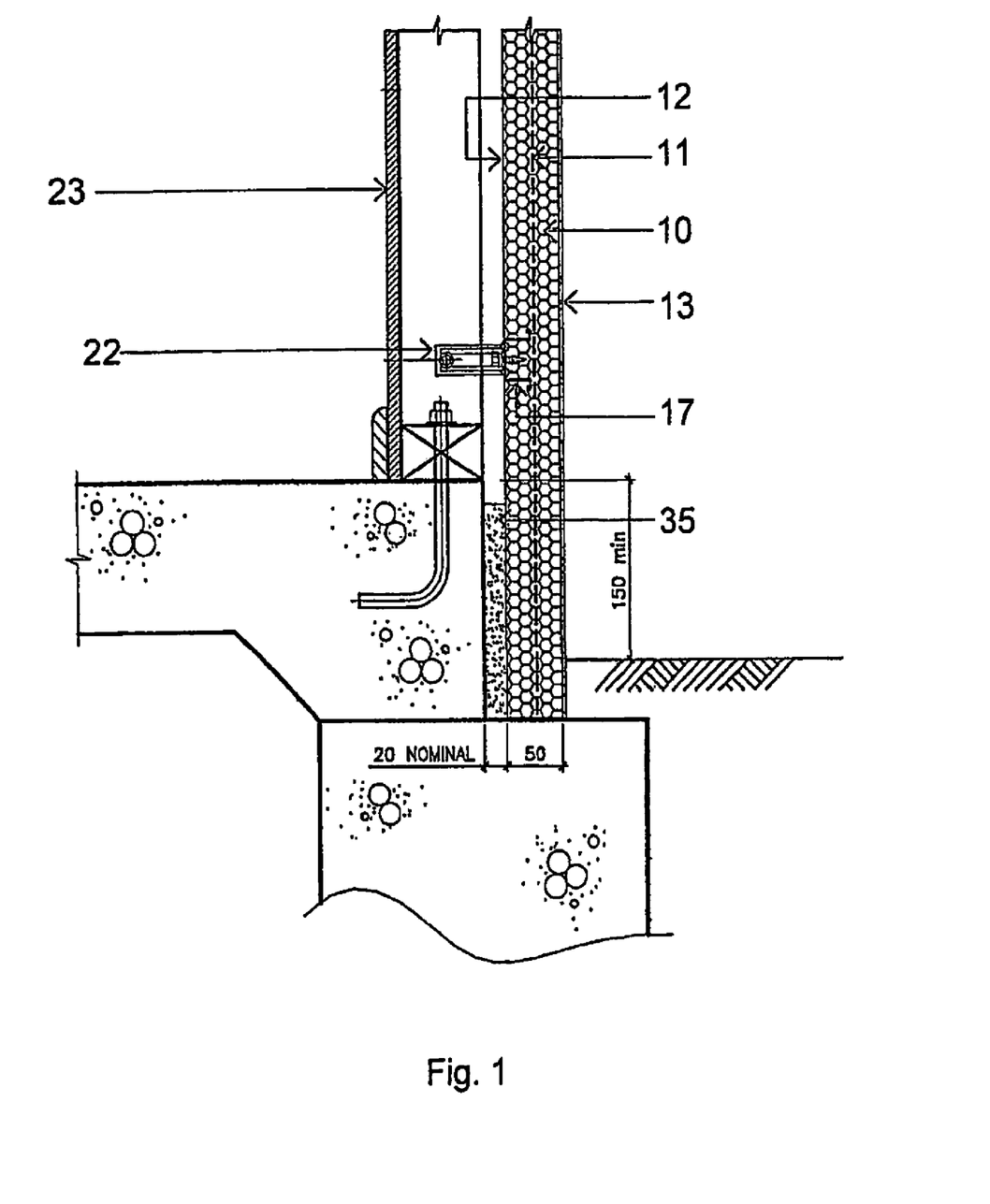
FIG. 1 is a part sectional view of a panel according to the invention as installed in relation to a first type of concrete slab arrangement.
Figure 2:
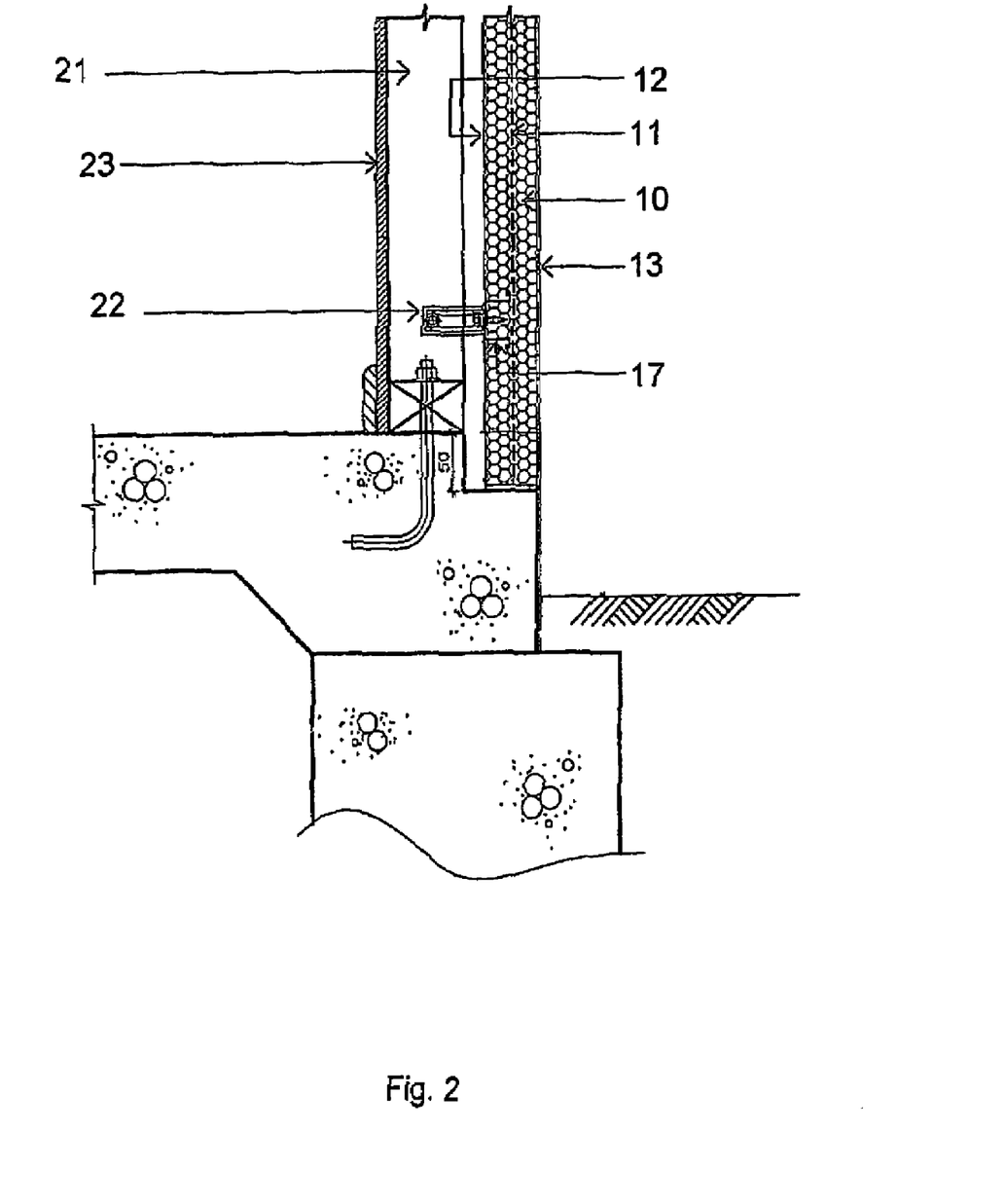
FIG. 2 is a part sectional view of a panel according to the invention as installed in relation to a second type of concrete slab arrangement.
Figure 3:
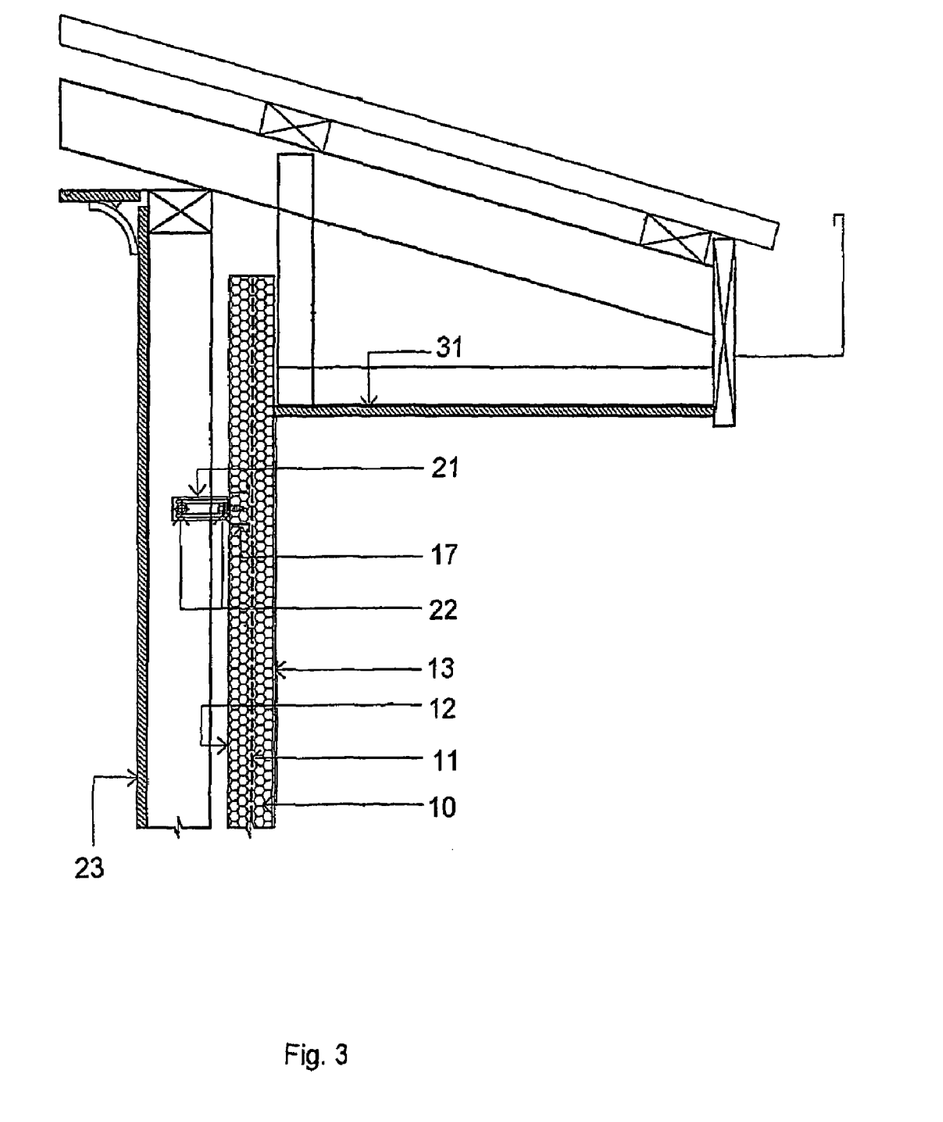
FIG. 3 is a part sectional view of a panel according to the invention as installed in relation to a first soffit arrangement.
Figure 4:
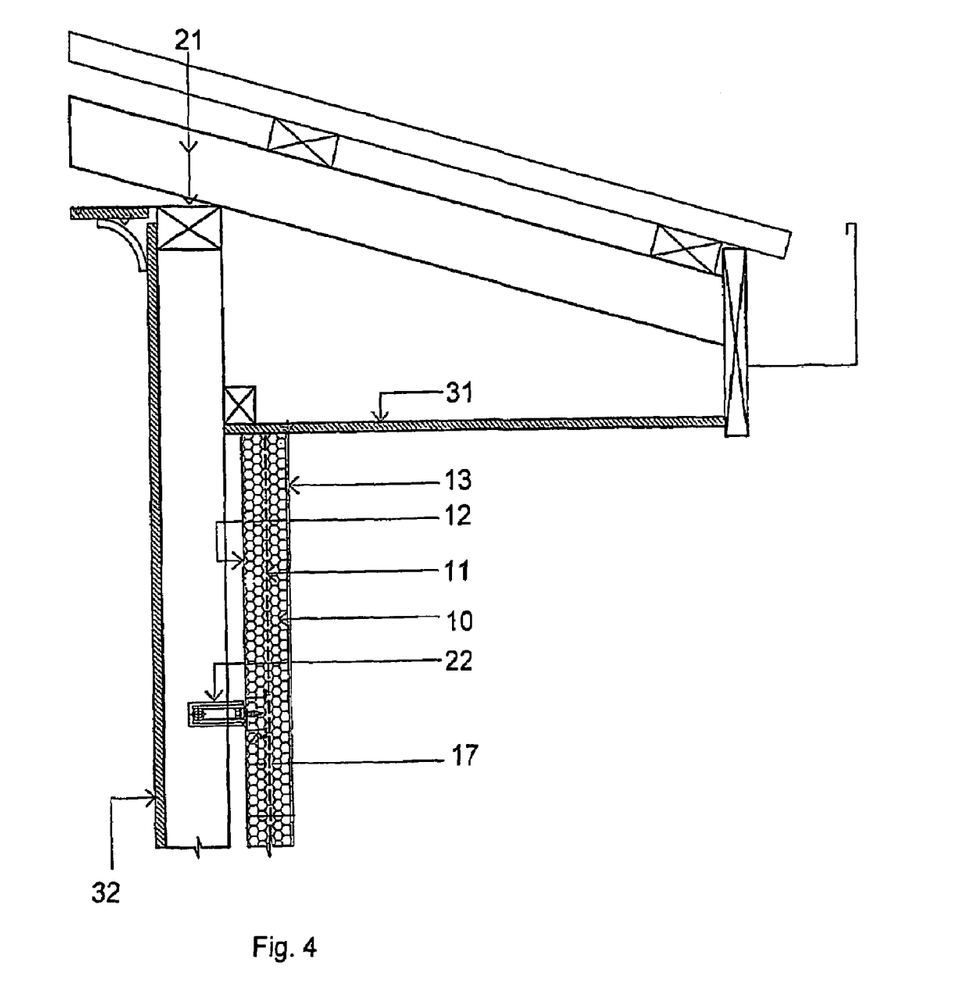
FIG. 4 is a part sectional view of a panel according to the invention as installed in relation to a second soffit arrangement.
Figure 5:
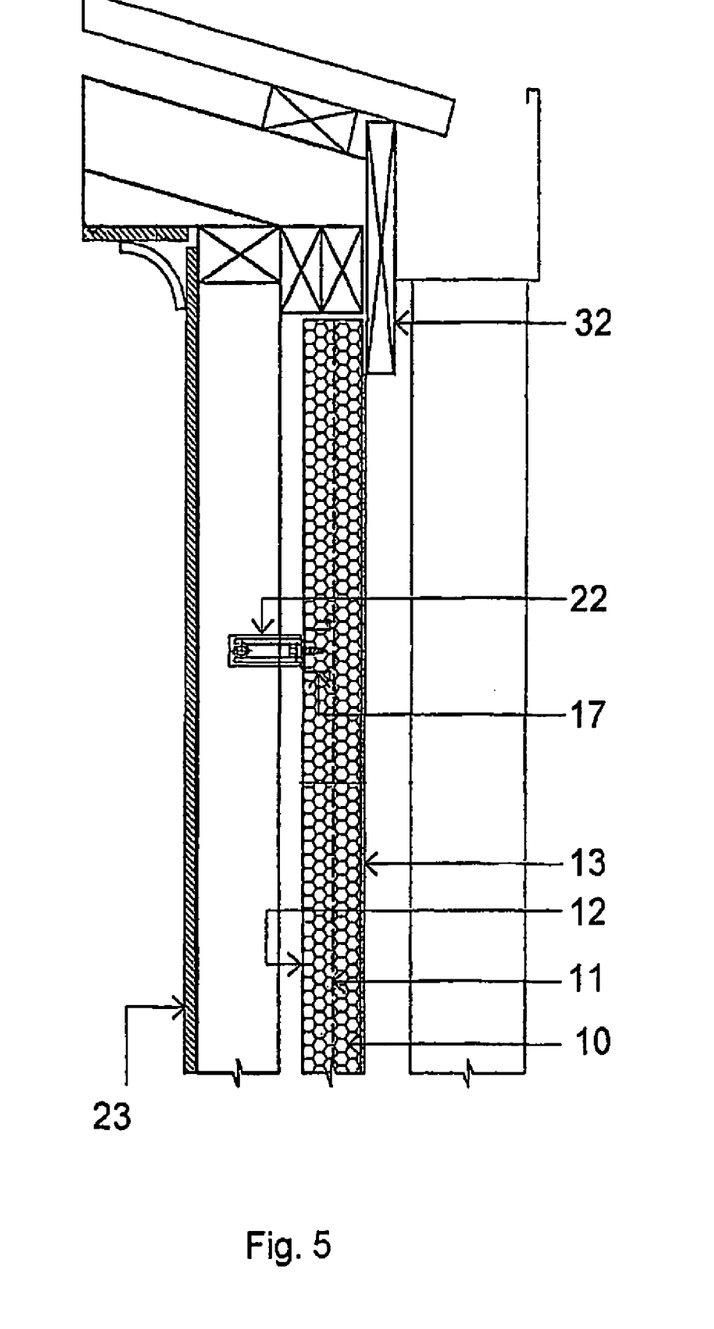
FIG. 5 is a part sectional view of a panel according to the invention as installed in relation to a flush eave arrangement.

Referring to FIG. 1, the base of the panel rests on a silicone bead provided on the upper face of a footing which supports a concrete slab which rests on in FIG. 2, the base of the panel rests on the upper face of a step on the edge of the concrete slab which itself is supported on a footing, Referring to FIG. 3, the panel extends above the soffit lining 31, but in FIG. 4, the upper edge of the panel abuts against the underside face of the soffit lining. Referring to FIG. 5, a facia board 32 covers an upper strip of the outer face near the upper edge of the panel.

Figure 6:
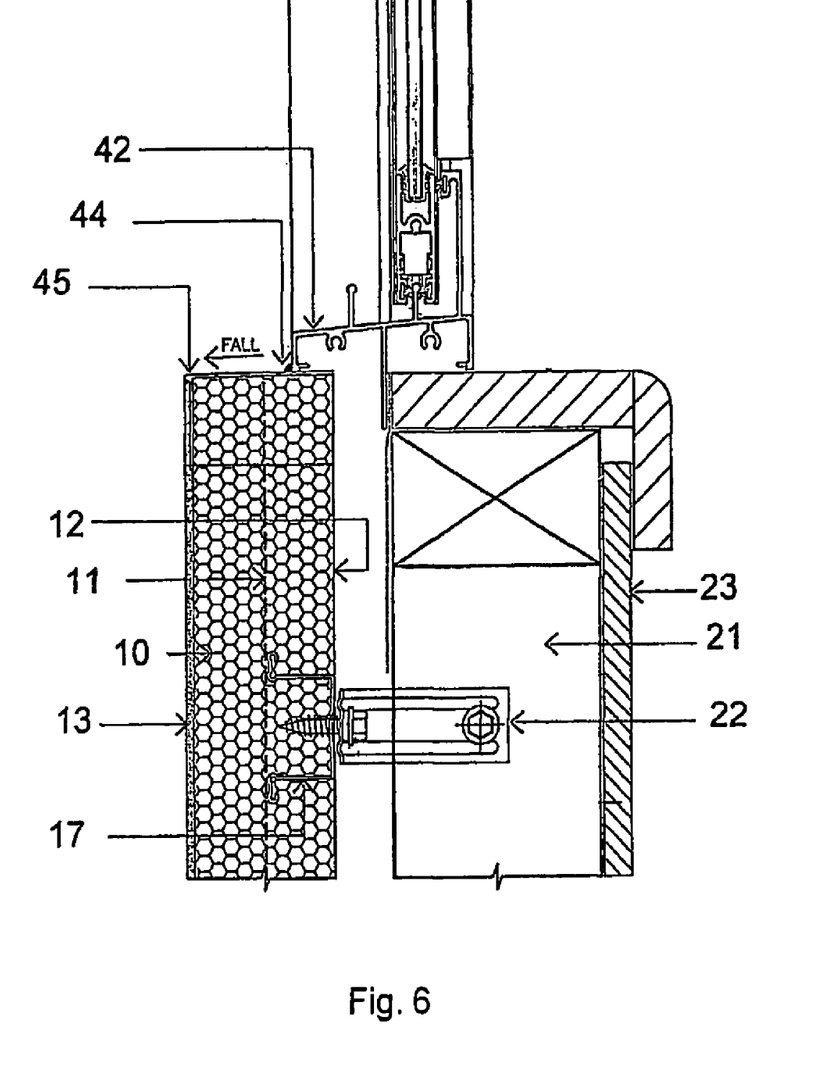
FIG. 6 is a part sectional view of a panel according to the invention as installed in relation to a window sill.
Figure 7:
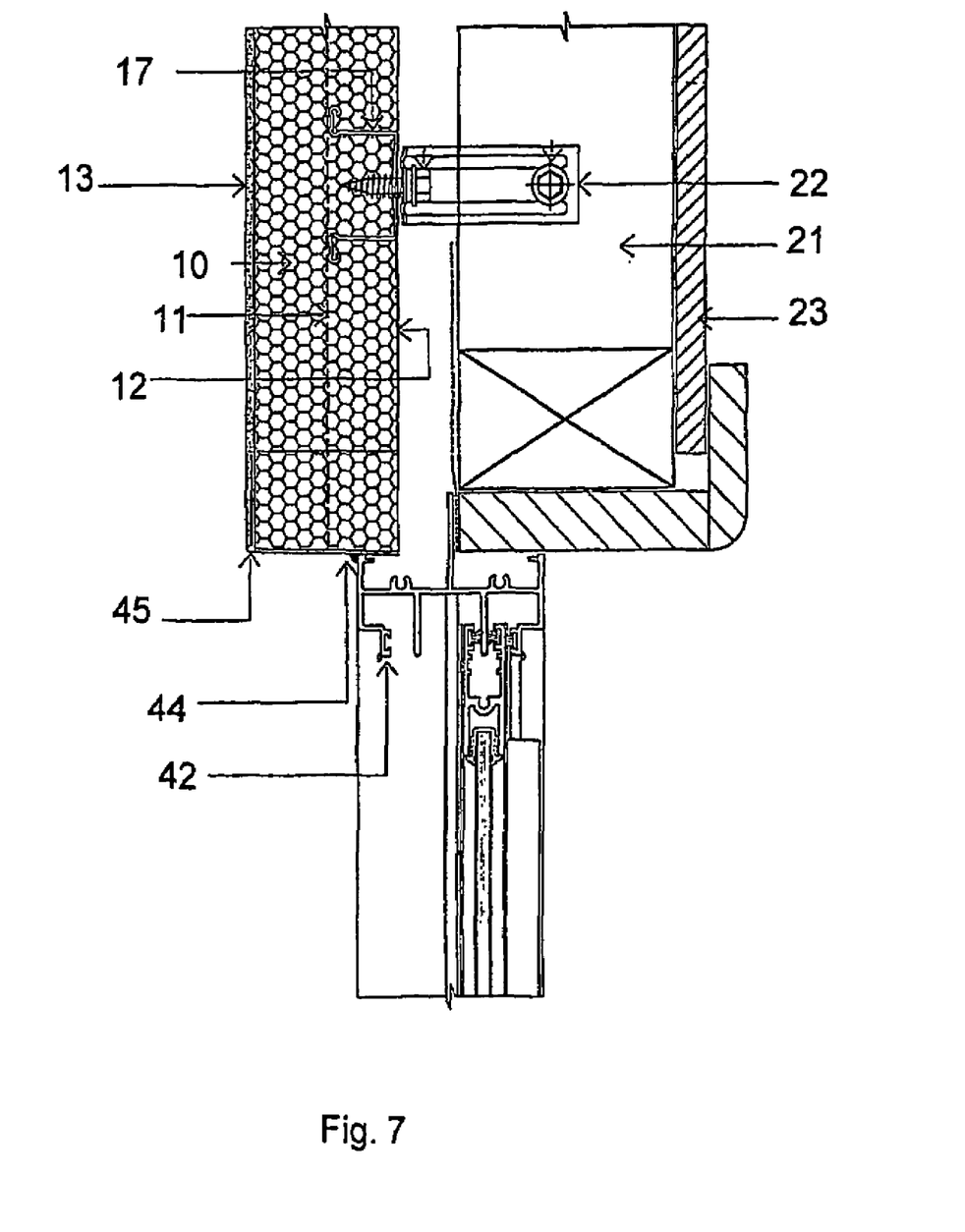
FIG. 7 is a part sectional view of a panel according to the invention as installed in relation to a window head.

Referring to FIGS. 6 and 7, the edges of the panel closest to the window frames 42 are encased by an edge angle 45 with one flange embedded between the render and the panel core, and the other flange forming the edge of the panel. A bead of sealant 44 is applied to seal the edge of the panel with respect to the window frames.

Although the invention has been described with reference to specific examples, it will be appreciated by those skilled in the art that the invention may be embodied in many other forms which fall within the broad scope and ambit of the invention as defined in the following claims.

The invention claimed is:

1. A settable mixture for use in a core material for a composite light weight building panel, said mixture including an acrylic, polymer-based resin comprising:
   85% by volume water based copolymer emulsion of polyvinyl acetate with versatate and acrylic copolymers in a water emulsion;
   10% water soluble colloid protector;
   5% additives;
   such that the resin obtains a specific gravity in the range of 100±50 g/l and an 8 Ford viscosity at 20° C. of 7±1; and the mixture having the following ratios:
   from 1 to 3 liters of cement;
   more than 2 liters of resin;
   from 10 to 100 liters of light weight filler material;
   less than 6 kilograms of water, and
   such that the volume of cement is more than half the volume of resin; and
   wherein the copolymer emulsion comprises 69.3% vinyl acetate, 29.7% vinyl versatate, and 1% acrylic acid, the polymers comprising 45.5% of the emulsion, the balance being water.

2. A settable mixture for use in a core material for a composite light weight building panel, said mixture including an acrylic, polymer-based resin as defined in claim 1 and having the ratios:
   from 1 to 1½ liters of cement;
   from 2 to 4 liters of resin;
   from 60 to 100 liters of light weight filler material;
   less than 2 kilograms of water; and
   such that the volume of the cement is more than half the volume of the resin.

3. A settable mixture for use in a core material according to claim 2, wherein the consistency of the mixture is paste-like and is formed to be substantially planar having two opposite spaced apart faces.

4. A settable mixture for use in a core material according to claim 3, wherein the further comprising a backing sheet, selected from fibro cement, plywood, and paper.

5. A settable mixture for use in a core material according to claim 2, wherein the mixture has the following ratios:
   6 liters of resin;
   8 liters of cement, and
   from 60 to 100 liters of a light weight filler material; and wherein the mixture is diluted with 4 liters of water.

6. A settable mixture for use in a core material according to claim 5, wherein the ratios of solids materials (cement and light weight filler material) and liquid materials (water and resin) are selected to produce a core forming composition of paste-like consistency when mixed together, and which may be formed into a desired shape.

7. A settable mixture for use in a core material according to claim 3, and further including a fibreglass textile sheet included within the core panel, approximately medially between the two faces.

8. A composite panel including a core material formed from a settable mixture according to claim 1 and having two spaced apart faces.

9. A composite panel including a core material formed from a settable mixture according to claim 1, wherein the core material is coated with a coating composition comprising a mixture of sand, standard quality cement, water, and the acrylic, polymer-based resin as defined in claim 1, the mixture having the following ratios:
for every kilogram of sand:
more than 20 volume percent (vol %) cement;
less than 12 vol % water; and more than 20 vol % resin;
such that the ratio of resin to water is more than four to one, and the ratio of resin to
cement is less than two to one.

10. A composite panel according to claim 9, wherein the coating composition is formulated without the water.

11. A composite panel according to claim 9, wherein the coating composition is formulated with water to more than 4 vol % of the sand.

12. A composite panel according to claim 9, wherein the coating composition has the proportions by volume of 5 liters of resin; 4 liters of cement, 20 kg (12 liters) of sand and 400 ml of water.

13. A composite panel according to claim 8, wherein one of the spaced apart faces is coated with an alternative coating composition comprising (by volume):
a primary portion of adhesive material formed from ethylene vinyl acetate copolymer diluted with 0% to 8% water, and
a secondary portion of textile material at least partially embedded in the primary portion.

14. A composite panel according to claim 13, wherein the textile material is embedded in the adhesive material, and such that the textile material is completely wetted or saturated by the adhesive material.

15. A composite panel according to claim 13, wherein the textile material is a fibreglass textile material ranging from a fibreglass tissue having a gram weight specification of 40/300 g/m$^2$ to a fibreglass mesh having a gram weight specification of 50/400 g/m$^2$.

16. A building panel having a backing sheet and a core formed from a core material which is formed from a settable mixture according to claim 1, the core bonded to the backing sheet, the core having a coatable face remote from the backing sheet, and a coating applied to the coatable face for weatherproofing the panel.

* * * * *